(12) United States Patent
Hayashitani et al.

(10) Patent No.: US 10,462,016 B2
(45) Date of Patent: Oct. 29, 2019

(54) COMMUNICATION CONTROL SYSTEM, COMMUNICATION CONTROL METHOD, AND RECORDING MEDIUM

(71) Applicant: NEC CORPORATION, Tokyo (JP)

(72) Inventors: Masahiro Hayashitani, Tokyo (JP); Yasuhiro Mizukoshi, Tokyo (JP)

(73) Assignee: NEC CORPORATION, Minao-ku, Tokyo (JP)

( * ) Notice: Subject to any disclaimer, the term of this patent is extended or adjusted under 35 U.S.C. 154(b) by 158 days.

(21) Appl. No.: 15/541,187

(22) PCT Filed: Jan. 13, 2016

(86) PCT No.: PCT/JP2016/000153
§ 371 (c)(1),
(2) Date: Jun. 30, 2017

(87) PCT Pub. No.: WO2016/117303
PCT Pub. Date: Jul. 28, 2016

(65) Prior Publication Data
US 2017/0353360 A1 Dec. 7, 2017

(30) Foreign Application Priority Data
Jan. 19, 2015 (JP) ................. 2015-007665

(51) Int. Cl.
H04L 12/24 (2006.01)
H04L 12/26 (2006.01)

(52) U.S. Cl.
CPC ........ *H04L 41/142* (2013.01); *H04L 43/0817* (2013.01); *H04L 43/0876* (2013.01);
(Continued)

(58) Field of Classification Search
None
See application file for complete search history.

(56) References Cited

U.S. PATENT DOCUMENTS 9,526,030 B2 * 12/2016 Goergen ............... H04L 1/1628
2005/0099952 A1 5/2005 Mohan et al.
(Continued)

FOREIGN PATENT DOCUMENTS

JP 10-150493 A 6/1998
JP 2000-115051 A 4/2000
(Continued)

OTHER PUBLICATIONS

Communication dated Aug. 8, 2018, issue by the Intellectual Property Office of Russian Federation in counterpart Application No. 2017129388/08.
(Continued)

*Primary Examiner* — Joshua Joo
(74) *Attorney, Agent, or Firm* — Sughrue Mion, PLLC

(57) ABSTRACT

A communication control system to obtain required reliability for an entire network is provided. The communication control system includes: a means for obtaining, based on a load status of a control device that controls nodes included in a network and receives a content of a control signal sent and received between the nodes as a status notification signal, a capability for processing the status notification signal; a means for determining, based on network status information related to communication on the network, area segments each including an arbitrarily number of the nodes; and a means for calculating, based on the capability, a sending interval of the status notification signal of the node for each of the area segments, and sending the sending interval to the node included in the corresponding area segment.

9 Claims, 12 Drawing Sheets

(52) U.S. Cl.
CPC ........ *H04L 43/103* (2013.01); *H04L 41/0893* (2013.01); *H04L 41/12* (2013.01); *H04L 43/0829* (2013.01); *H04L 43/0852* (2013.01)

(56) References Cited

U.S. PATENT DOCUMENTS

| | | |
|---|---|---|
| 2011/0016213 A1 | 1/2011 | Nakao |
| 2013/0010600 A1 | 1/2013 | Jocha et al. |
| 2014/0280834 A1* | 9/2014 | Medved ................ H04L 47/122 709/223 |
| 2017/0063637 A1* | 3/2017 | Kashyap ................ H04L 41/12 |

FOREIGN PATENT DOCUMENTS

| | | |
|---|---|---|
| JP | 2001-333071 A | 11/2001 |
| JP | 2006-164234 A | 6/2006 |
| JP | 2009-182495 A | 8/2009 |
| JP | 2013-168852 A | 8/2013 |
| JP | 2013-534081 A | 8/2013 |
| RU | 2183909 C2 | 6/2002 |
| WO | 2009/123204 A1 | 10/2009 |
| WO | 2014/119602 A1 | 8/2014 |

OTHER PUBLICATIONS

Communication dated Jun. 27, 2018 from the European Patent Office in counterpart Application No. 16739914.6.
Written Opinion for PCT/JP2016/000153, dated Mar. 15, 2016.
International Search Report for PCT/JP2016/000153, dated Mar. 15, 2016.

* cited by examiner

COMMUNICATION CONTROL SYSTEM, COMMUNICATION CONTROL METHOD, AND RECORDING MEDIUM

CROSS REFERENCE TO RELATED APPLICATIONS

This Application is a National Stage of International Application No. PCT/JP2016/000153 filed Jan. 13, 2016, claiming priority based on Japanese Patent Application No. 2015-007665 filed Jan. 19, 2015, the contents of all of which are incorporated herein by reference in their entirety.

TECHNICAL FIELD

The present invention relates to a communication control system, a communication control method, and a recording medium therefor, and particularly, relates to a communication control system, a communication control method, and a recording medium therefor in a system that centralizedly manages a network.

BACKGROUND

There are various known related arts for controlling a network.

For example, in a network, each node obtains a link status and a state between nodes by periodically exchanging a message such as Link Layer Discovery Protocol (LLDP) and Keep Alive. In a system that centralizedly manages such a network, a controller centralizedly managing a network receives, from each node obtaining a link status and a state, a message that notifies of the status and the state. In this manner, the controller obtains a status and a state of a network in a range under management of the own controller.

In a controller as described above, an increased number of nodes in a network causes more notification messages to a controller, which increases a load on the controller.

PTL 1 discloses a monitoring system coping with such a load increase. A center device of the monitoring system in PTL 1 determines, taking into consideration increase and decrease of a processing load in accordance with the number of terminal devices, a receiving time interval in such a way as to implement a message receiving interval in accordance with a processing capability of the own device. The receiving time interval indicates an interval at which the own center device receives a message from each of the terminal devices.

Further, in PTL 1, a transmitting interval of a terminal device is set in such a way that a terminal device having a higher frequency of occurrence of request information from the center device has a shorter transmitting interval. With this setting, the center device preferentially monitors a terminal device that the center device desires to intensively monitor.

In addition, there is a related art for controlling a network as follows.

PTL 2 discloses an information sharing space provision system. The information sharing space provision system in PTL 2 includes the following configurations. First, a synchronization control information management unit, an object information management unit, and an invitation unit of each of a plurality of terminals reflect control of a group to a storage unit of each of the terminals. Herein, examples of control of a group include an operation on a shared object, member addition, and group creation which are performed between the terminals. Secondly, a message control unit of each of the terminals notifies another terminal that constitutes a group, of a processing content. Thirdly, the terminal having received the notification reflects the notification in the same way. In this manner, the information sharing space provision system shares information within a group formed of arbitrarily selected members.

PTL 3 discloses a mobile communication system that transmits and receives data by using a shared channel. A base station device of the mobile communication system in PTL 3 includes the following configurations. First, a within-range check signal generating means generates a within-range check signal for a first mobile station device among mobile station devices present in an area of coverage. Herein, the first mobile station device is a mobile station device shifted to an intermittent reception status and/or an intermittent transmission status. In addition, the within-range check signal is a signal for checking that the first mobile station device is present in an area. Secondly, a within-range check signal transmission control means executes control in such a way as to transmit the within-range check signal to a second mobile station device among the shifted first mobile station devices. The second mobile station device is a mobile station device in which time over a within-range check signal transmission cycle elapses in the intermittent reception status and/or the intermittent transmission status. By including these configurations, the base station device determines that a mobile station device is within a range when a response to a within-range check signal can be received from the mobile station device to which the within-range check signal is transmitted.

PTL 4 discloses a Device Assisted Service (DAS) for protecting network capacity. First, the DAS monitors a network service usage activity of a communications device in network communication. Secondly, the DAS classifies the network service usage activity for the purpose of differential network access control for protecting network capacity. Thirdly, the DAS associates, based on the classification of the network service usage activity, the network service usage activity with a network service usage control policy in order to facilitate realizing differential network access control for protecting network capacity.

CITATION LIST

Patent Literature

[PTL 1] International Publication WO 2009/123204
[PTL 2] Japanese Patent Application Laid-Open Publication No. 2006-164234
[PTL 3] Japanese Patent Application Laid-Open Publication No. 2009-182495
[PTL 4] Japanese Translation of PCT International Application Publication No. JP-T-2013-534081

SUMMARY OF INVENTION

Technical Problem

A network is required to be available with the least possible difficulty. In other words, there is an issue that reliability of a network is made as high as possible.

Reliability of a network is dependent on frequency with which the network is monitored. In other words, the higher the frequency is, the quicker a trouble occurring in a network can be taken care of. Accordingly, the higher the frequency is, the higher reliability of a network is. On the other hand, the lower the frequency of monitoring is, the lower reliability of a network is.

However, the monitoring system described above in PTL 1 has a problem that there is a case of being unable to satisfy required reliability for an entire network. The reason is that no consideration is given to whether a processing capability of a center device of the monitoring system is sufficient for processing the entire network or not when a transmitting interval of a terminal device to be monitored intensively by the center device becomes shorter.

In other words, in the technique described in PTL 1, a transmitting interval of a message of a terminal device to be monitored intensively is determined without consideration of a processing capability of a center device. Thus, the center device may be unable to satisfy required reliability for an entire network.

An object of the present invention is to provide a communication control system, a communication control method, and a recording medium therefor that can solve the above-described problem.

Solution to Problem

A communication control system according to an exemplary aspect of the present invention includes: status notification signal processing capability obtaining means for obtaining, based on a load status of a control device that controls nodes included in a network and receives a content of a control signal sent and received between the nodes as a status notification signal, a capability for processing the status notification signal; monitoring area identifying means for determining, based on network status information related to communication on the network, area segments each including an arbitrarily number of the nodes; and sending interval control signal transmitting means for calculating, based on the capability, a sending interval of the status notification signal of the node for each of the area segments, and sending the sending interval to the node included in the corresponding area segment.

A communication control method performed by a computer according to an exemplary aspect of the present invention includes: obtaining, based on a load status of a control device that controls nodes included in a network and receives a content of a control signal sent and received between the nodes as a status notification signal, a capability for processing the status notification signal; determining, based on network status information related to communication on the network, area segments each including an arbitrarily number of the nodes; calculating, based on the capability, a sending interval of the status notification signal of the node for each of the area segments; and sending the sending interval to the node included in the corresponding area segment.

A computer readable storage medium according to an exemplary aspect of the present invention records thereon a program causing a computer to perform a method including: obtaining, based on a load status of a control device that controls nodes included in a network and receives a content of a control signal sent and received between the nodes as a status notification signal, a capability for processing the status notification signal; determining, based on network status information related to communication on the network, area segments each including an arbitrarily number of the nodes; calculating, based on the capability, a sending interval of the status notification signal of the node for each of the area segments; and sending the sending interval to the node included in the corresponding area segment.

Advantageous Effects of Invention

An advantageous effect of the present invention is that required reliability for an entire network can be obtained.

DESCRIPTION OF EMBODIMENTS

Example embodiments of the present invention will be described in detail with reference to drawings. Note that the same components are assigned with the same reference symbols throughout the respective drawings and respective example embodiments described herein, and description therefor will be omitted as appropriate. In addition, a direction of an arrow in each of the drawings indicates an example, but does not limit example embodiments of the present invention.

First Example Embodiment

Figure 1:
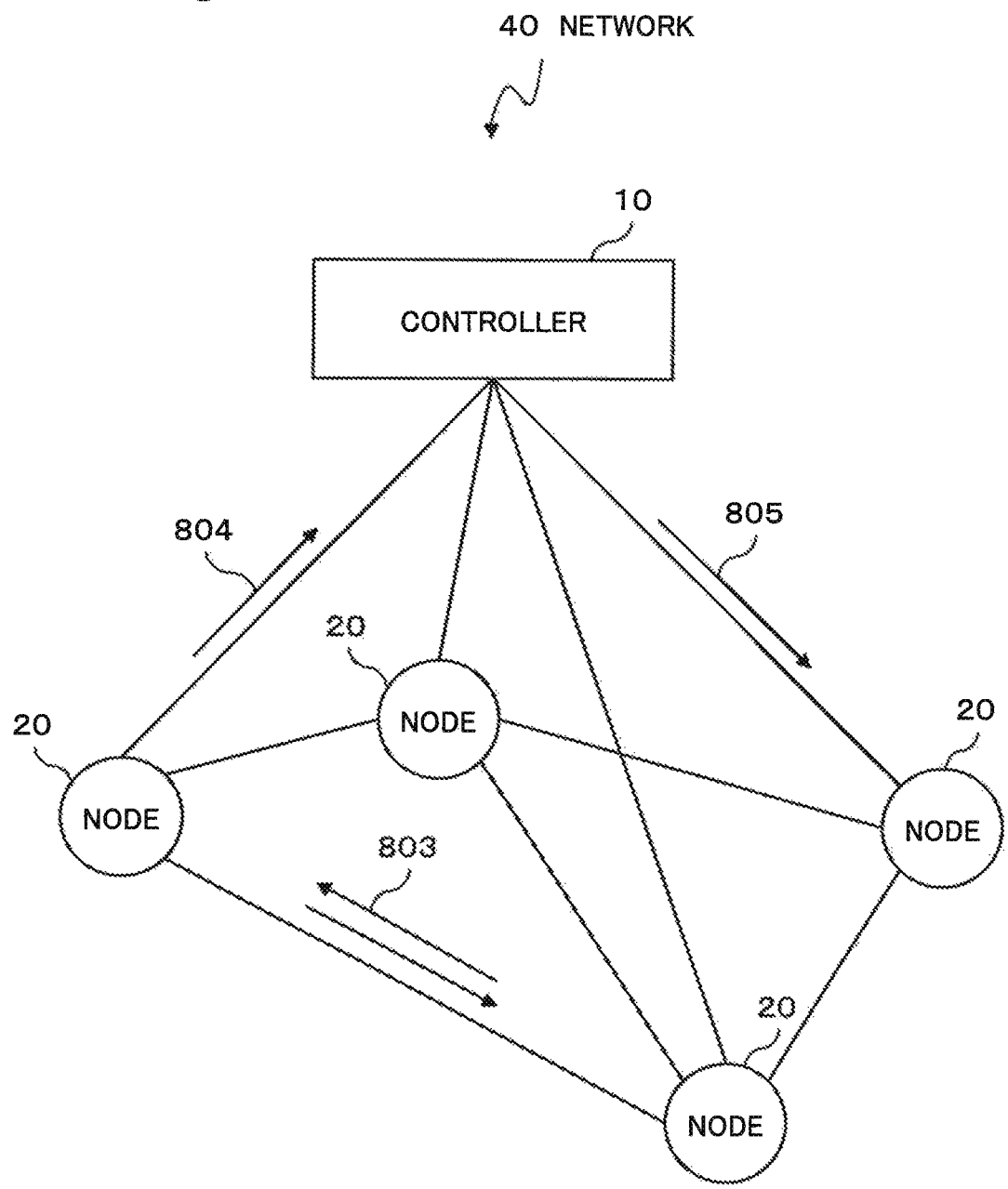
FIG. 1 is a diagram illustrating an example of a network configuration according to a first example embodiment of the present invention.

FIG. 1 is a diagram illustrating an example of a network configuration according to a first example embodiment of the present invention. As illustrated in FIG. 1, a network 40 is constituted of a controller (also referred to as a communication control system) 10 and a plurality of nodes 20. Note that, irrespective of the example illustrated in FIG. 1, the network 40 may include an arbitrary number of the nodes 20.

===Node 20===

A link exists between the nodes 20. Then, each of the nodes 20 exchanges a status monitoring signal 803 with an adjacent node. Herein, an adjacent node of a node 20 is another node 20 that has a direct link with the own node 20. The status monitoring signal 803 is a message such as Keep Alive, LLDP, and Operation Administration and Maintenance (OAM), for example. The node 20 sends, to the controller 10, a content of the status monitoring signal 803 received from the adjacent node as a status notification signal 804.

===Controller 10===

The controller 10 is connected with each of the nodes 20. Then, the controller 10 receives the status notification signal 804 from each of the nodes 20. The controller 10 calculates a sending interval based on a controller load and a network status, and sends a sending interval control signal 805 including the calculated sending interval to each of the nodes 20. Herein, the sending interval is information that indicates a lower limit of an interval for the node 20 to send the status notification signal 804.

===Controller 100===

Figure 2:
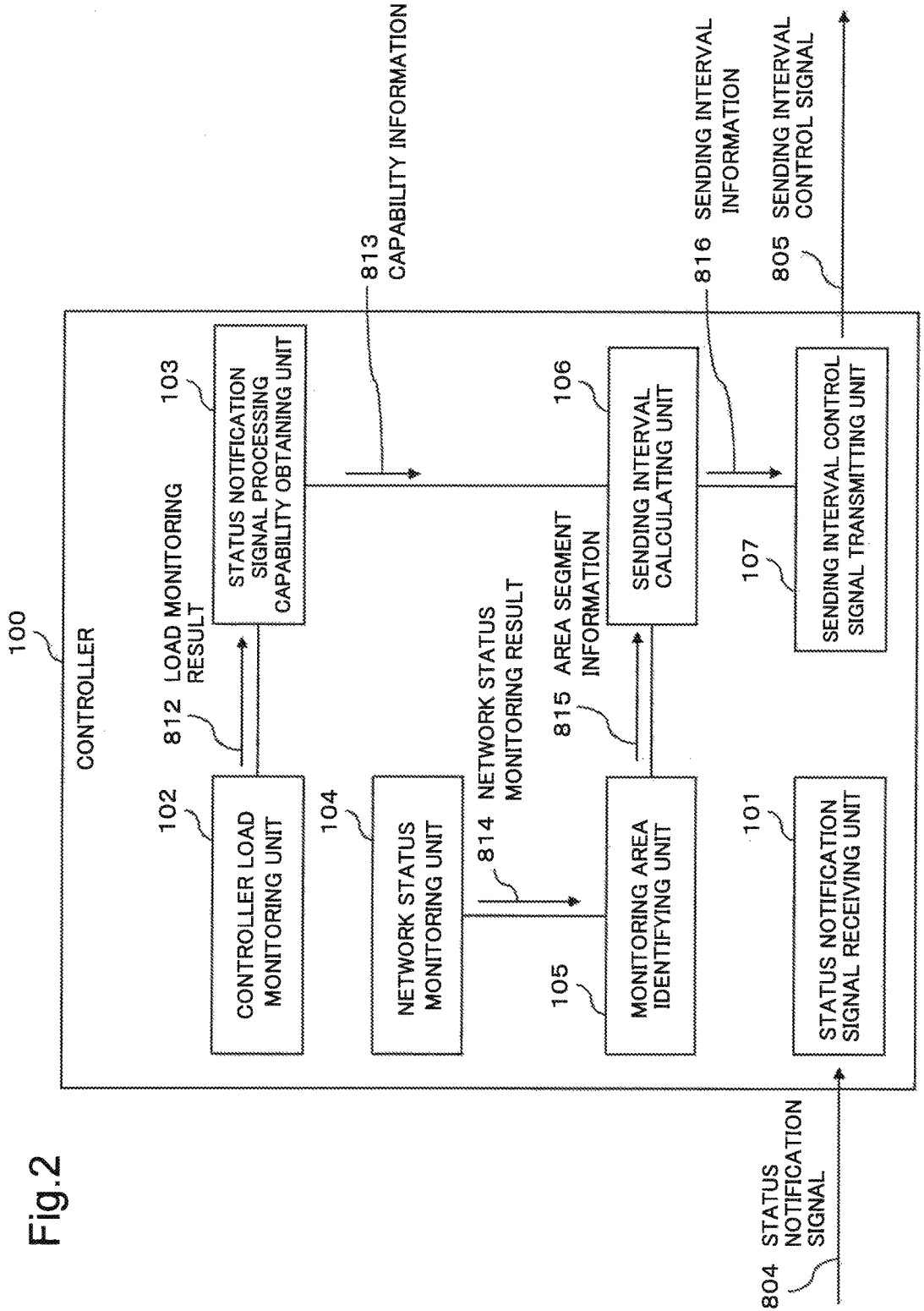
FIG. 2 is a block diagram illustrating a configuration of a controller according to the first example embodiment of the present invention.

FIG. 2 is a block diagram illustrating a configuration of a controller 100 according to the first example embodiment of the present invention. The controller 100 is one of specific examples of the controller 10 illustrated in FIG. 1.

As illustrated in FIG. 2, the controller 100 includes a status notification signal receiving unit 101, a controller load monitoring unit 102, a status notification signal processing capability obtaining unit 103, a network status monitoring unit 104, a monitoring area identifying unit 105, a sending interval calculating unit 106, and a sending interval control signal transmitting unit 107.

The components illustrated in FIG. 2 may be a circuit on a hardware basis, a module included in a microchip, or components divided into functional units of a computer device. Herein, a case in which the components illustrated in FIG. 2 are components divided into functional units of a computer device will be described as an example. Note that the controller 100 illustrated in FIG. 2 may be available via a network by being implemented on a server. In addition, the components of the controller 100 illustrated in FIG. 2 may be available by being dispersedly disposed on a network.

The status notification signal receiving unit 101 receives a status notification signal 804 from the node 20.

The controller load monitoring unit 102 monitors a load of the controller 100. The controller load monitoring unit 102 sends, to the status notification signal processing capability obtaining unit 103, a result obtained by monitoring the load as a load monitoring result 812.

The status notification signal processing capability obtaining unit 103 receives the load monitoring result 812 from the controller load monitoring unit 102. The status notification signal processing capability obtaining unit 103 obtains, based on the load monitoring result 812, a capability of being able to process the status notification signal 804 received by the controller 100. The status notification signal processing capability obtaining unit 103 sends, to the sending interval calculating unit 106, a result of obtaining the capability as capability information 813.

The network status monitoring unit 104 monitors a status of the network 40. The network status monitoring unit 104 sends, to the monitoring area identifying unit 105, a result obtained by monitoring the status as a network status monitoring result 814.

The monitoring area identifying unit 105 receives the network status monitoring result 814 from the network status monitoring unit 104. The monitoring area identifying unit 105 divides, based on the network status monitoring result 814, a monitoring area into area segments. The monitoring area identifying unit 105 sends, to the sending interval calculating unit 106, information on the area segments as area segment information 815.

Figure 3:
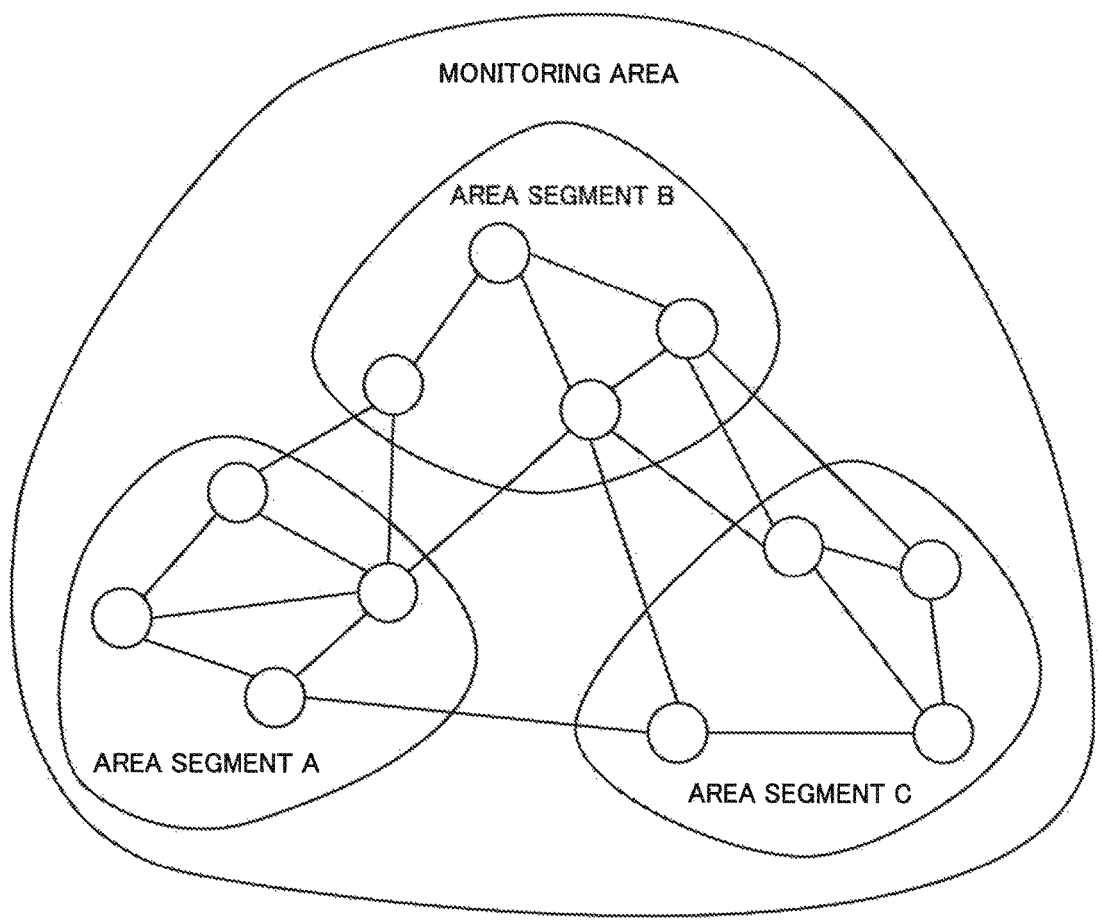
FIG. 3 is a diagram illustrating an example of division of a monitoring area according to the first example embodiment of the present invention.

FIG. 3 is a diagram illustrating an example of division of a monitoring area performed by the monitoring area identifying unit 105 according to the first example embodiment of the present invention. Herein, a circle in the drawing indicates the node 20. In addition, a line connecting between circles indicates a link.

As illustrated in FIG. 3, a monitoring area (a region composed of the plurality of nodes 20 that are included in the network 40 and are control objects of the controller 10) is separated into a plurality of area segments. Dividing the monitoring area into these area segments allows the controller 100 to vary a sending interval of the status notification signal 804 for each of the area segments. Herein, an area segment may include an enclave, in other words, a node 20 that does not have a direct link (that is not adjacent).

The sending interval calculating unit 106 receives the above-described capability information 813 from the status notification signal processing capability obtaining unit 103. In addition, the sending interval calculating unit 106 receives the above-described area segment information 815 from the monitoring area identifying unit 105. The sending interval calculating unit 106 calculates, based on the capability information 813 and the area segment information 815, a sending interval for each of the area segments. The sending interval calculating unit 106 sends, to the sending interval control signal transmitting unit 107, the calculated sending interval as sending interval information 816.

The sending interval control signal transmitting unit 107 receives the sending interval information 816 from the sending interval calculating unit 106. The sending interval control signal transmitting unit 107 sends, to the nodes 20 included in each of the area segments, a sending interval control signal 805 including the sending interval information 816 for the corresponding area segment, based on the sending interval information 816.

===Node 200===

Figure 4:
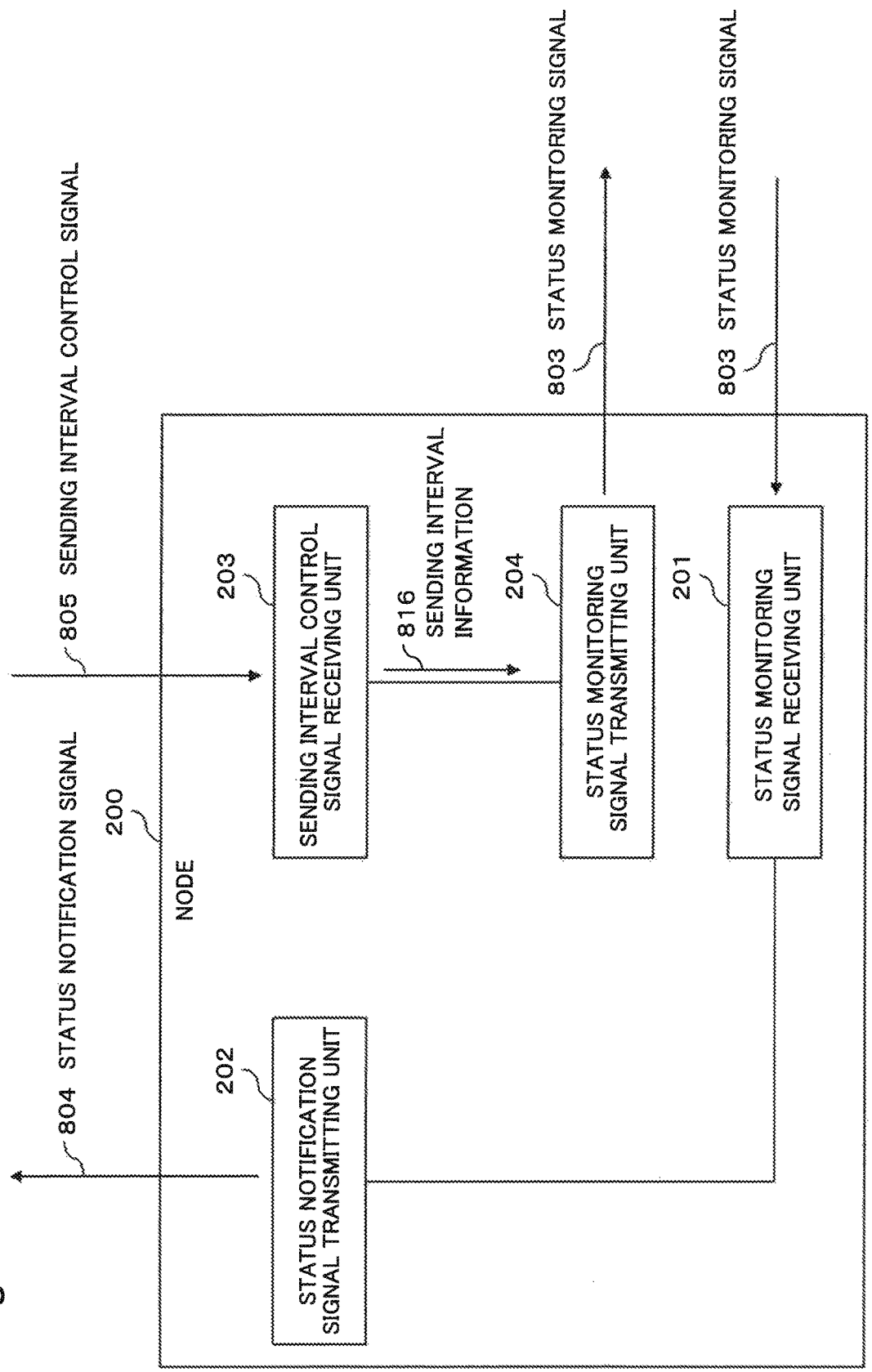
FIG. 4 is a block diagram illustrating a configuration of a node according to the first example embodiment of the present invention.

FIG. 4 is a block diagram illustrating a configuration of a node 200 according to the first example embodiment of the present invention. The node 200 is one of specific examples of the node 20 illustrated in FIG. 1.

As illustrated in FIG. 4, the node 200 includes a status monitoring signal receiving unit 201, a status notification signal transmitting unit 202, a sending interval control signal receiving unit 203, and a status monitoring signal transmitting unit 204.

The status monitoring signal receiving unit 201 receives a status monitoring signal 803 from an adjacent node, and sends information related to the status monitoring signal 803 to the status notification signal transmitting unit 202.

The status notification signal transmitting unit 202 receives the information related to the status monitoring signal 803 from the status monitoring signal receiving unit 201. The status notification signal transmitting unit 202 sends, based on the information, the status notification signal 804 to the controller 100.

The sending interval control signal receiving unit 203 receives, from the controller 100, the sending interval control signal 805 including the sending interval information 816 of the status notification signal 804. The sending interval control signal receiving unit 203 sends, based on the sending interval control signal 805, the sending interval information 816 to the status monitoring signal transmitting unit 204.

The status monitoring signal transmitting unit 204 receives the sending interval information 816 from the sending interval control signal receiving unit 203, and changes, based on the received sending interval information 816, a sending interval of the status monitoring signal 803. The status monitoring signal transmitting unit 204 sends the status monitoring signal 803 based on the changed sending interval. In this manner, the status monitoring signal 803 of an area segment including the node 200 is sent and received at the changed sending interval. Accordingly, the status notification signal transmitting unit 202 sends the status notification signal 804 at the changed sending interval.

Figure 5:
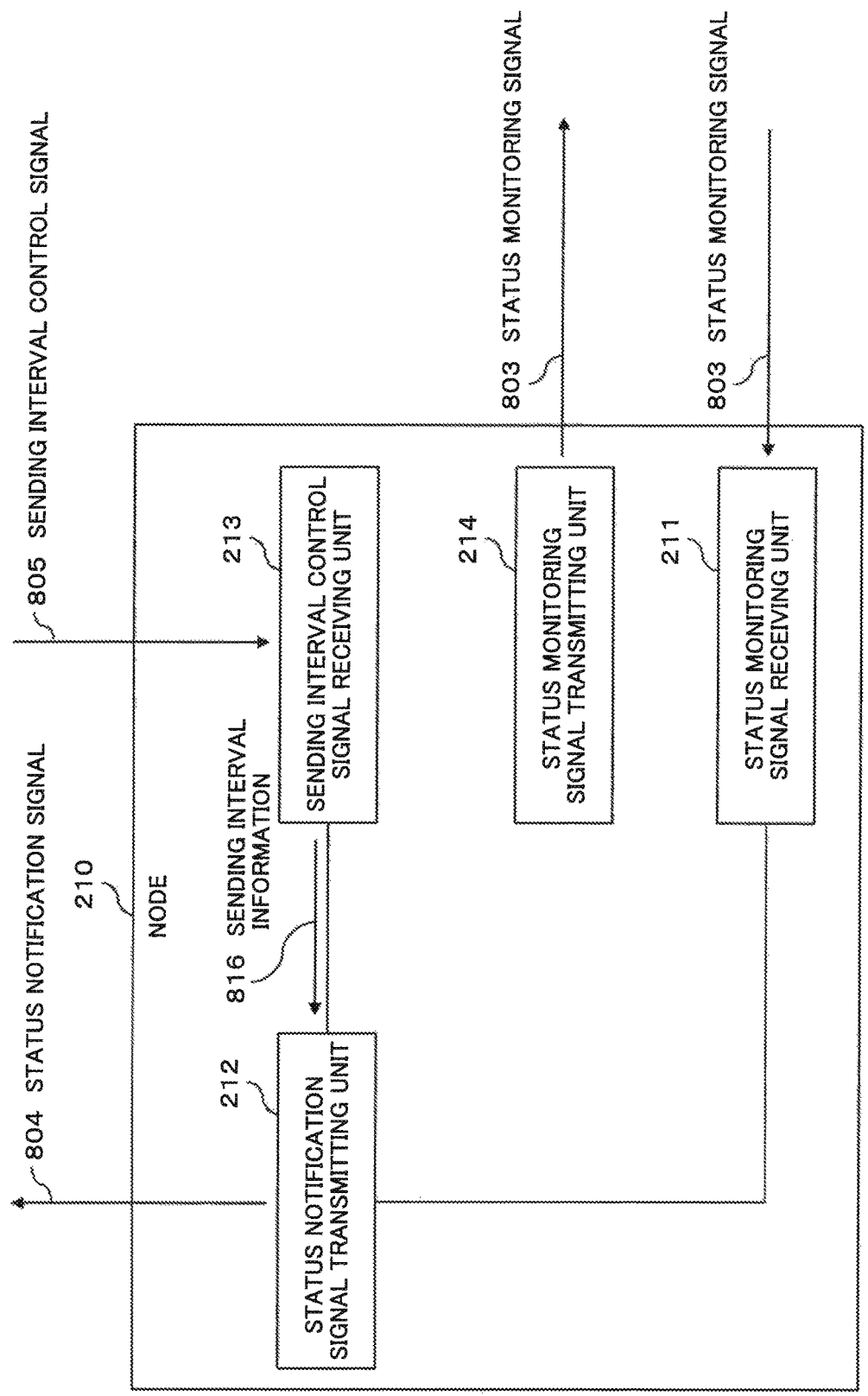
FIG. 5 is a block diagram illustrating a configuration of a node according to the first example embodiment of the present invention.

FIG. 5 is a block diagram illustrating a configuration of a node 210 according to the first example embodiment of the present invention. The node 210 is another one of specific examples of the node 20 illustrated in FIG. 1.

As illustrated in FIG. 5, the node 210 includes a status monitoring signal receiving unit 211, a status notification signal transmitting unit 212, a sending interval control signal receiving unit 213, and a status monitoring signal transmitting unit 214. The status monitoring signal receiving unit 211 is the same as the status monitoring signal receiving unit 201 illustrated in FIG. 4.

The status monitoring signal transmitting unit 214 sends a status monitoring signal 803 at an arbitrary interval.

The sending interval control signal receiving unit 213 receives, from the controller 100, the sending interval control signal 805 including the sending interval information 816. The sending interval control signal receiving unit 213 sends, based on the sending interval control signal 805, the sending interval information 816 to the status notification signal transmitting unit 212.

The status notification signal transmitting unit 212 receives the sending interval information 816 from the sending interval control signal receiving unit 213, and changes, based on the received sending interval information 816, a sending interval of the status notification signal 804. The status notification signal transmitting unit 212 sends the status notification signal 804 based on the changed sending interval.

Next, components on a hardware basis in a case of implementing the first example embodiment of the present invention by using a computer will be described.

Figure 6:
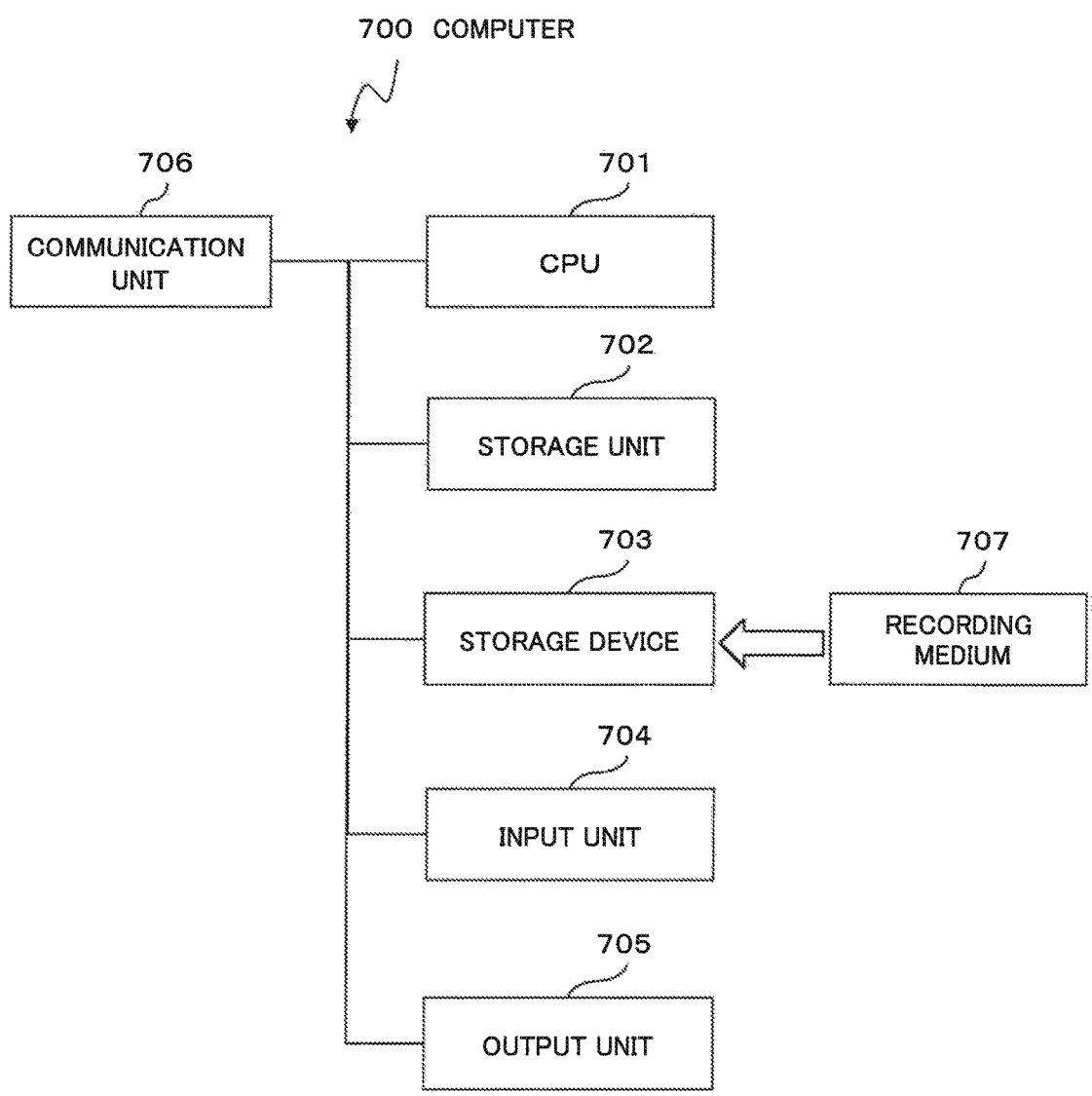
FIG. 6 is a block diagram illustrating a hardware configuration of a computer that implements the controller according to the first example embodiment of the present invention.

FIG. 6 is a diagram illustrating a hardware configuration of a computer 700 that implements the controller 100 according to the first example embodiment of the present invention.

As illustrated in FIG. 6, the computer 700 includes a Central Processing Unit (CPU) 701, a storage unit 702, a storage device 703, an input unit 704, an output unit 705, and a communication unit 706. Further, the computer 700 includes a recording medium (or a storage medium) 707 that is supplied from outside and is attached to the storage device 703. For example, the recording medium 707 is a non-volatile recording medium (non-transitory recording medium) that stores information in a non-transitory manner. In addition, the recording medium 707 may be a transitory recording medium that holds information as a signal.

The CPU 701 controls overall operation of the computer 700 by running an operating system (not illustrated). For example, the CPU 701 reads a program and data from the recording medium 707 attached to the storage device 703, and writes the read program and data into the storage unit 702. Herein, the program is, for example, a program for causing the computer 700 to execute operation of a flowchart illustrated in FIG. 7 to be described later.

Then, the CPU 701 executes, in accordance with a read program and based on read data, various types of processing as the status notification signal receiving unit 101, the controller load monitoring unit 102, the status notification signal processing capability obtaining unit 103, the network status monitoring unit 104, the monitoring area identifying unit 105, the sending interval calculating unit 106, and the sending interval control signal transmitting unit 107 illustrated in FIG. 2.

Note that the CPU 701 may download a program and data onto the storage unit 702 from an external computer (not illustrated) connected to a communication network (not illustrated).

The storage unit 702 stores a program and data. The storage unit 702 may store the load monitoring result 812, the capability information 813, the network status monitoring result 814, the area segment information 815, the sending interval information 816, the status notification signal 804, and the sending interval control signal 805 described above. In addition, the storage unit 702 may be included as a part of the status notification signal receiving unit 101, the controller load monitoring unit 102, the status notification signal processing capability obtaining unit 103, the network status monitoring unit 104, the monitoring area identifying unit 105, the sending interval calculating unit 106, and the sending interval control signal transmitting unit 107.

The recording medium 707 attached to the storage device 703 is, for example, an optical disk, a flexible disk, a magneto-optical disk, an external hard disk, a semiconductor memory, and the like. The recording medium 707 stores a program in a computer-readable manner. In addition, the recording medium 707 may store the load monitoring result 812, the capability information 813, the network status monitoring result 814, the area segment information 815, the sending interval information 816, the status notification signal 804, and the sending interval control signal 805 described above. The storage device 703 reads a program and data from the recording medium 707, and writes a program and data into the recording medium 707. In addition, the storage device 703 may store a program and data read from the recording medium 707. The storage device 703 may be included as a part of the status notification signal receiving unit 101, the controller load monitoring unit 102, the status notification signal processing capability obtaining unit 103, the network status monitoring unit 104, the monitoring area identifying unit 105, the sending interval calculating unit 106, and the sending interval control signal transmitting unit 107.

The input unit 704 accepts input of operation performed by an operator and input of information from outside. A device used in input operation is, for example, a mouse, a keyboard, a built-in key button, a touch panel, and the like.

The output unit 705 is implemented by a display, for example. The output unit 705 is used for, for example, input request to an operator by means of a GRAPHICAL User Interface (GUI), output presentation to an operator, and the like.

The communication unit 706 implements an interface with the node 20 and a not-illustrated external device. The communication unit 706 may be included as a part of the status notification signal receiving unit 101, the network status monitoring unit 104, and the sending interval control signal transmitting unit 107.

As described above, the components as the functional units of the controller 100 illustrated in FIG. 2 are implemented by the computer 700 as a hardware configuration illustrated in FIG. 6. However, an implementation means for each of the units included in the computer 700 is not limited to the above. In other words, the computer 700 may be implemented by a physically coupled single device, or may be implemented by a plurality of devices that are equal to or more than two physically separated devices being connected each other through a wired or wireless connection.

Note that, when the above-described recording medium 707 recording a program code is supplied to the computer 700, the CPU 701 may read and execute the program code stored in the recording medium 707. Alternatively, the CPU 701 may store the program code stored in the recording medium 707, into the storage unit 702, the storage device 703, or both of the storage unit 702 and the storage device 703. In other words, the first example embodiment of the present invention includes an example embodiment of the recording medium 707 that stores a program (software) to be executed by the computer 700 (the CPU 701) in a transitory or non-transitory manner. Note that a storage medium that stores information in a non-transitory manner is also called as a non-volatile storage medium.

The above description has been given about the components on a hardware basis of the computer 700 that implements the controller 100 according to the first example embodiment of the present invention.

Next, operation of the first example embodiment of the present invention will be described in detail with reference to the drawings.

Figure 7:
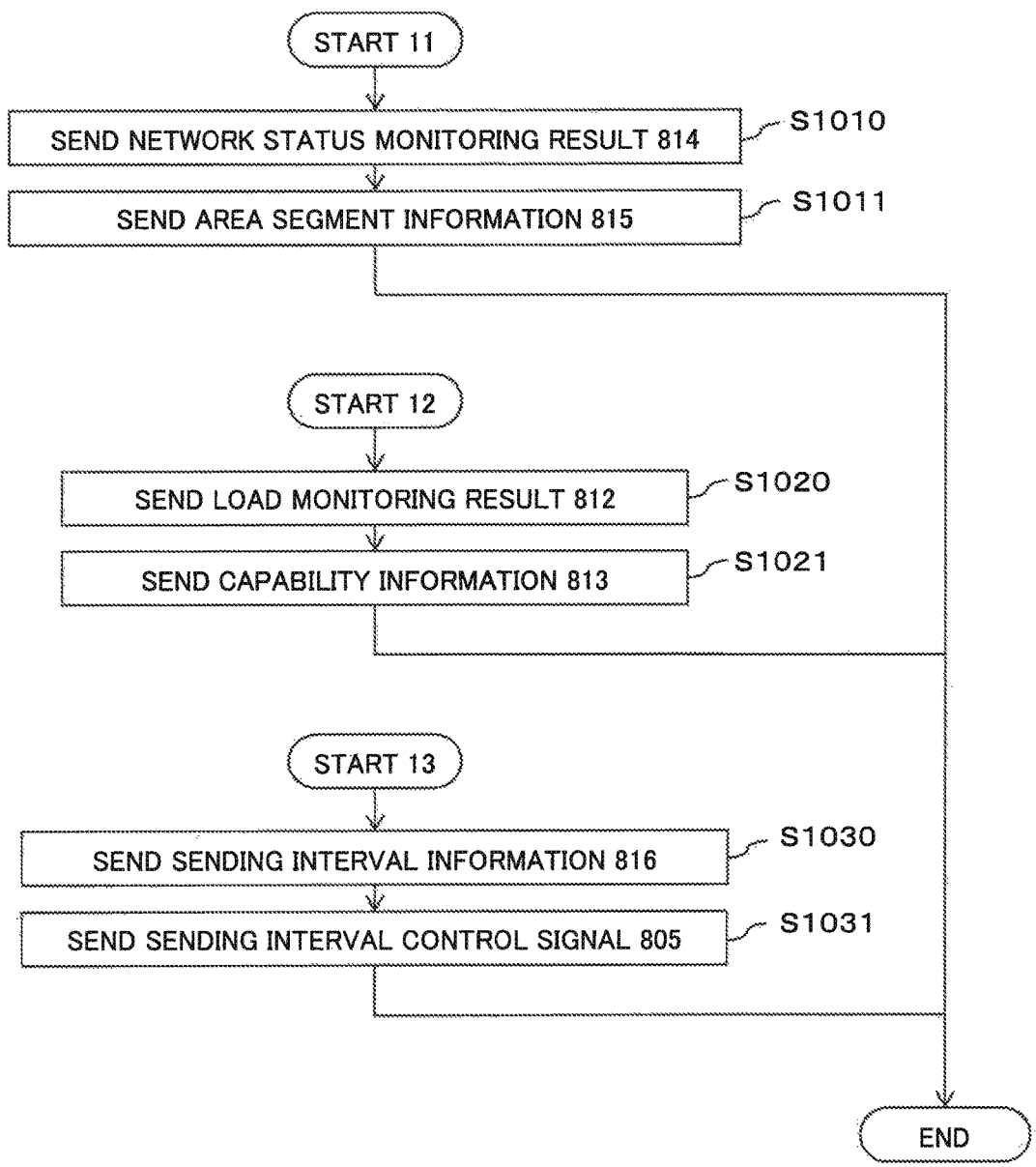
FIG. 7 is a flowchart illustrating operation of the controller according to the first example embodiment of the present invention.

FIG. 7 is a flowchart illustrating operation of the controller 100 according to the first example embodiment of the present invention. Note that processing according to the flowchart may be executed based on a program control performed by the aforementioned CPU 701. In addition, a step name of processing will be described with a sign such as S1000.

The controller 100 starts the operation of the flowchart illustrated in FIG. 7 triggering that a predetermined time has come. The predetermined time is, for example, a time of a fixed interval. Predetermined times that respectively correspond to "Start 11", "Start 12", and "Start 13" illustrated in FIG. 7 may be the same or different. In addition, a timing of "End" illustrated in FIG. 7 may be a start time of any arbitrary one of "Start 11", "Start 12", and "Start 13". For example, a timing of "End" of operation started from "Start 13" may be a timing at which operation started from "Start 11" and operation started from "Start 12" are alternately started.

When the controller 100 starts processing from "Start 11", the network status monitoring unit 104 monitors a status of the network 40, and generates and sends a network status monitoring result 814 based on a result of monitoring the status (Step S1010). Specifically, the network status monitoring unit 104 monitors an inflow/outflow state, a priority, and the like of traffic of the network 40. Herein, the network status monitoring unit 104 may predict a state of the network 40 based on a result of monitoring the status, and may send, to the monitoring area identifying unit 105, a result of predicting the state as the network status monitoring result 814.

Next, the monitoring area identifying unit 105 distinctively identifies a monitoring area based on the network status monitoring result 814. The monitoring area identifying unit 105 generates area segment information 815 based on a result of identifying the monitoring area, and sends the generated area segment information 815 (Step S1011). Thereafter, the controller 100 ends the processing.

In addition, when the controller 100 starts processing from "Start 12", the controller load monitoring unit 102 monitors a load of the controller 100, and generates and sends a load monitoring result 812 based on a result of monitoring the load (Step S1020). Specifically, the controller load monitoring unit 102 monitors a load, such as a CPU use rate and a memory use rate of a server running the controller 100. Herein, the controller load monitoring unit 102 may predict an operating state of the controller 100 based on a result of monitoring the load, and may send, to the status notification signal processing capability obtaining unit 103, a result of predicting the operating state as the load monitoring result 812.

Next, the status notification signal processing capability obtaining unit 103 obtains, based on the load monitoring result 812, a processing capability of a status notification signal 804, and sends a result of obtaining the processing capability as capability information 813 (Step S1021). For example, the status notification signal processing capability obtaining unit 103 obtains a resource of the controller 100 that can be used for processing the status notification signal 804, such as "a CPU use rate 10% and a memory use rate 10% can be used for processing the status notification signal 804". Thereafter, the controller 100 ends the processing.

When the controller 100 starts processing from "Start 13", the sending interval calculating unit 106 calculates, based on the area segment information 815 received from the monitoring area identifying unit 105 and the capability information 813 received from the status notification signal processing capability obtaining unit 103, a sending interval for each area segment. The sending interval calculating unit 106 sends a value of the calculated sending interval as sending interval information 816 (Step S1030).

Figure 8:
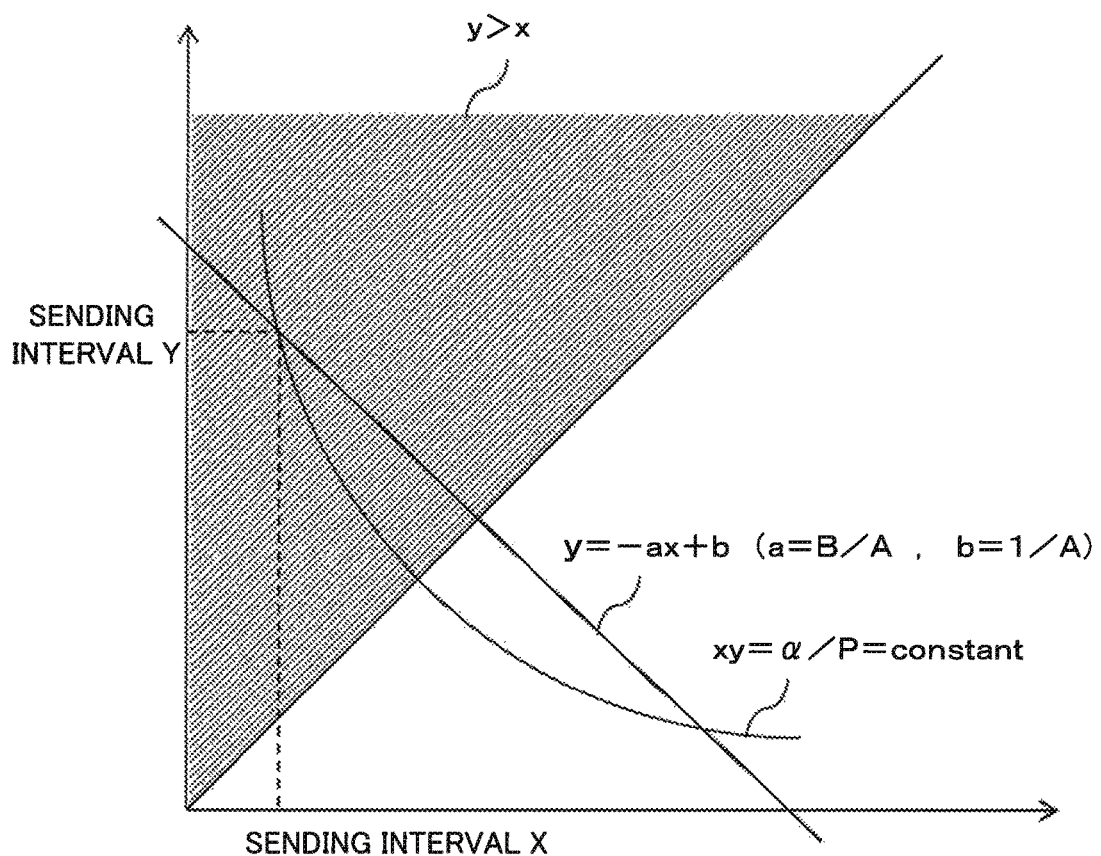
FIG. 8 is a diagram illustrating an example of a method of calculating a sending interval according to the first example embodiment of the present invention.

FIG. 8 is a diagram illustrating an example of a method of calculating a sending interval according to the first example embodiment of the present invention.

In the example illustrated in FIG. 8, there are two area segments. It is assumed that the controller 100 monitors nodes 20 in one area segment and nodes 20 in another area segment. The number of the nodes 20 in the one area is A, and the number of the nodes 20 in another area is B. Herein, the controller 100 distinguishes the area segments based on the number of the nodes 20. However, the controller 100 may distinguish the area segments based on the number of links and the like.

From an expression of a status notification signal processing capability P=α(the number of nodes A÷a sending interval X+the number of nodes B÷a sending interval Y), a signal sending interval is found for each of the area segments. In the expression, α is a coefficient.

Herein, it is assumed that, for example, the number of nodes A is the number of nodes of an area segment for which a sending interval is to be shortened. In this case, the number of nodes B is a number obtained by subtracting the number of nodes A from a total number of nodes under management of the controller 100. In addition, the sending interval X is a signal sending interval for the area segment with the number of nodes A, and the sending interval Y is a signal sending interval for the area segment with the number of nodes B. Thus, the sending interval X is shorter than the sending interval Y (X>Y). In other words, this assumes that a state of the area segment with the number of nodes A is to be intensively monitored.

FIG. 8 is a diagram that represents, on the above-described assumption, the sending interval X as an x-axis and the sending interval Y as a y-axis, and illustrates an example of finding, based on the aforementioned expression (P=α (A/X+B/Y)), a sending interval for each of the area segments from a graph. In FIG. 8, values of x and y at a coordinate of an intersection of a curve and a line are found, in which the values of x and y satisfy a condition (y>x) of a sending interval, the curve corresponds to an expression (xy=α/P=constant) where xy takes a constant value, and the line corresponds to an expression (y=−ax+b) of a linear function of x and y. The respective values of x and y are the sending interval X and the sending interval Y. Note that, in the above-described expression (y=−ax+b) of a linear function, a=B/A and b=1/A.

This enables determination of a sending interval for each of the area segments while satisfying a status notification signal processing capability. Irrespective of the example above, there may be equal to or more than three area segments. In this case, a graph to be used is a three- or higher dimensional graph.

Returning to FIG. 7, the sending interval control signal transmitting unit 107 sends, based on the sending interval information 816 received from the sending interval calculating unit 106, a sending interval control signal 805 including the sending interval information 816 to the nodes 20 in each of the area segments (Step S1031). Thereafter, the controller 100 ends the processing.

Next, an advantageous effect of the first example embodiment of the present invention will be described.

A first effect of the first example embodiment of the present invention described above is that required reliability for the entire network 40 can be obtained.

The reason is that the sending interval calculating unit 106 calculates a sending interval based on the capability information 813 generated by the status notification signal processing capability obtaining unit 103 and the area segment information 815 generated by the monitoring area identifying unit 105.

In other words, since the controller 100 can shorten a sending interval of an area segment to be intensively monitored while taking into consideration a processing capability of the controller 100, the controller 100 can enhance reliability of the network 40.

Second Example Embodiment

Next, a second example embodiment of the present invention will be described in detail with reference to the drawings. Hereinafter, description of a content that overlaps with the above description will be omitted, as far as description of the second example embodiment of the present invention does not become obscure.

In the second example embodiment of the present invention, a controller further obtains a link status from a state of the status notification signal 804, identifies a network status in more detail, and divides a monitoring area into area divisions. In this manner, the controller according to the second example embodiment of the present invention sets a sending interval of each of the area segments while taking into consideration a processing capability of the own controller more appropriately.

Figure 9:
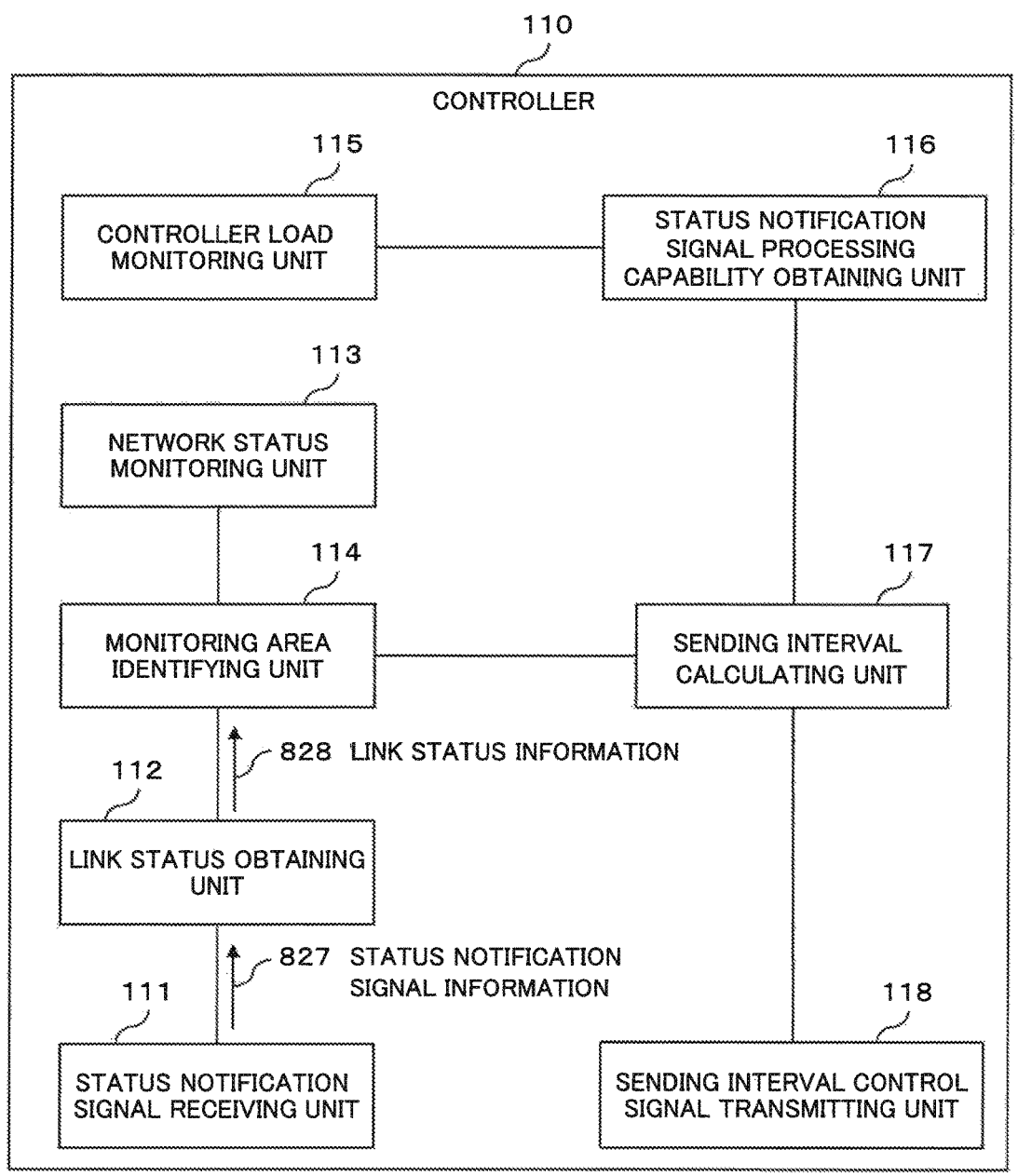
FIG. 9 is a block diagram illustrating a configuration of a controller according to a second example embodiment of the present invention.

FIG. 9 is a block diagram illustrating a configuration of a controller 110 according to the second example embodiment of the present invention. The controller 110 is one of specific examples of the controller 10 illustrated in FIG. 1.

===Controller 110===

As illustrated in FIG. 9, the controller 110 includes a status notification signal receiving unit 111, a link status obtaining unit 112, a network status monitoring unit 113, a monitoring area identifying unit 114, a controller load monitoring unit 115, a status notification signal processing capability obtaining unit 116, a sending interval calculating unit 117, and a sending interval control signal transmitting unit 118.

The components illustrated in FIG. 9 may be a circuit on a hardware basis, a module included in a microchip, or components divided into functional units of a computer device. Herein, a case in which the components illustrated in FIG. 9 are components divided into functional units of a computer device will be described as an example. Note that the controller 110 illustrated in FIG. 9 may be available via a network by being implemented on a server. In addition, the components of the controller 110 illustrated in FIG. 9 may be available by being dispersedly disposed on a network.

The status notification signal receiving unit 111 receives a status notification signal 804 from a node, and sends, to the link status obtaining unit 112, the received information as status notification signal information 827.

The link status obtaining unit 112 receives the status notification signal information 827 from the status notification signal receiving unit 111. The link status obtaining unit 112 obtains, based on the status notification signal information 827, a status of each link. The link status obtaining unit 112 sends, to the monitoring area identifying unit 114, the obtained status of each link as link status information 828.

The network status monitoring unit 113 monitors a status of the network 40, and sends, to the monitoring area identifying unit 114, a result of monitoring the status as a network status monitoring result 814.

The monitoring area identifying unit 114 receives the network status monitoring result 814 from the network status monitoring unit 113, and receives the link status information 828 from the link status obtaining unit 112. The monitoring area identifying unit 114 divides, based on the network status monitoring result 814 and the link status information 828, a monitoring area into area segments. The monitoring area identifying unit 114 sends, to the sending interval calculating unit 117, a result of dividing the monitoring area into area segments as area segment information 815.

The controller load monitoring unit 115 monitors a load of the controller 110, and sends, to the status notification signal processing capability obtaining unit 116, a result of monitoring the load as a load monitoring result 812.

The status notification signal processing capability obtaining unit 116 receives the load monitoring result 812 from the controller load monitoring unit 115. The status notification signal processing capability obtaining unit 116 obtains, based on the load monitoring result 812, a capability of being able to process the status notification signal 804 received by the controller 110. The status notification signal processing capability obtaining unit 116 sends, to the sending interval calculating unit 117, a result of obtaining the capability as capability information 813.

The sending interval calculating unit 117 receives the above-described capability information 813 from the status notification signal processing capability obtaining unit 116. In addition, the sending interval calculating unit 117 receives the above-described area segment information 815 from the monitoring area identifying unit 114. The sending interval calculating unit 117 calculates, based on the capability information 813 and the area segment information 815, a sending interval for each of the area segments. The sending interval calculating unit 117 sends, to the sending interval control signal transmitting unit 118, the calculated sending interval as sending interval information 816.

The sending interval control signal transmitting unit 118 receives the sending interval information 816 from the sending interval calculating unit 117. The sending interval control signal transmitting unit 118 sends, to each of the nodes 20 included in each of the area segments, a sending interval control signal 805 including the sending interval information 816 for the corresponding area segment, based on the sending interval information 816.

The controller 110 may be implemented by the computer 700 illustrated in FIG. 6, similarly to the controller 100.

In this case, the CPU 701 executes, in accordance with a read program and based on read data, various types of processing as the status notification signal receiving unit 111, the link status obtaining unit 112, the network status monitoring unit 113, the monitoring area identifying unit 114, the controller load monitoring unit 115, the status notification signal processing capability obtaining unit 116, the sending interval calculating unit 117, and the sending interval control signal transmitting unit 118 illustrated in FIG. 9. Herein, the program is, for example, a program for causing the computer 700 to execute operation of a flowchart illustrated in FIG. 10 to be described later.

The storage unit 702 may further store the status notification signal information 827 and the link status information 828. The storage unit 702 may be included as a part of the status notification signal receiving unit 111, the link status obtaining unit 112, the network status monitoring unit 113, the monitoring area identifying unit 114, the controller load monitoring unit 115, the status notification signal processing capability obtaining unit 116, the sending interval calculating unit 117, and the sending interval control signal transmitting unit 118.

The storage device 703 may further store the status notification signal information 827 and the link status information 828. The storage device 703 may be included further as a part of the status notification signal receiving unit 111, the link status obtaining unit 112, the network status monitoring unit 113, the monitoring area identifying unit 114, the controller load monitoring unit 115, the status notification signal processing capability obtaining unit 116, the sending interval calculating unit 117, and the sending interval control signal transmitting unit 118.

The communication unit 706 may be included as a part of the status notification signal receiving unit 111, the network status monitoring unit 113, and the sending interval control signal transmitting unit 118.

The node 20 may be the node 200 illustrated in FIG. 4, the node 210 illustrated in FIG. 5, or the like, similarly to the first example embodiment of the present invention.

Next, operation of the second example embodiment of the present invention will be described in detail with reference to the drawings.

Figure 10:
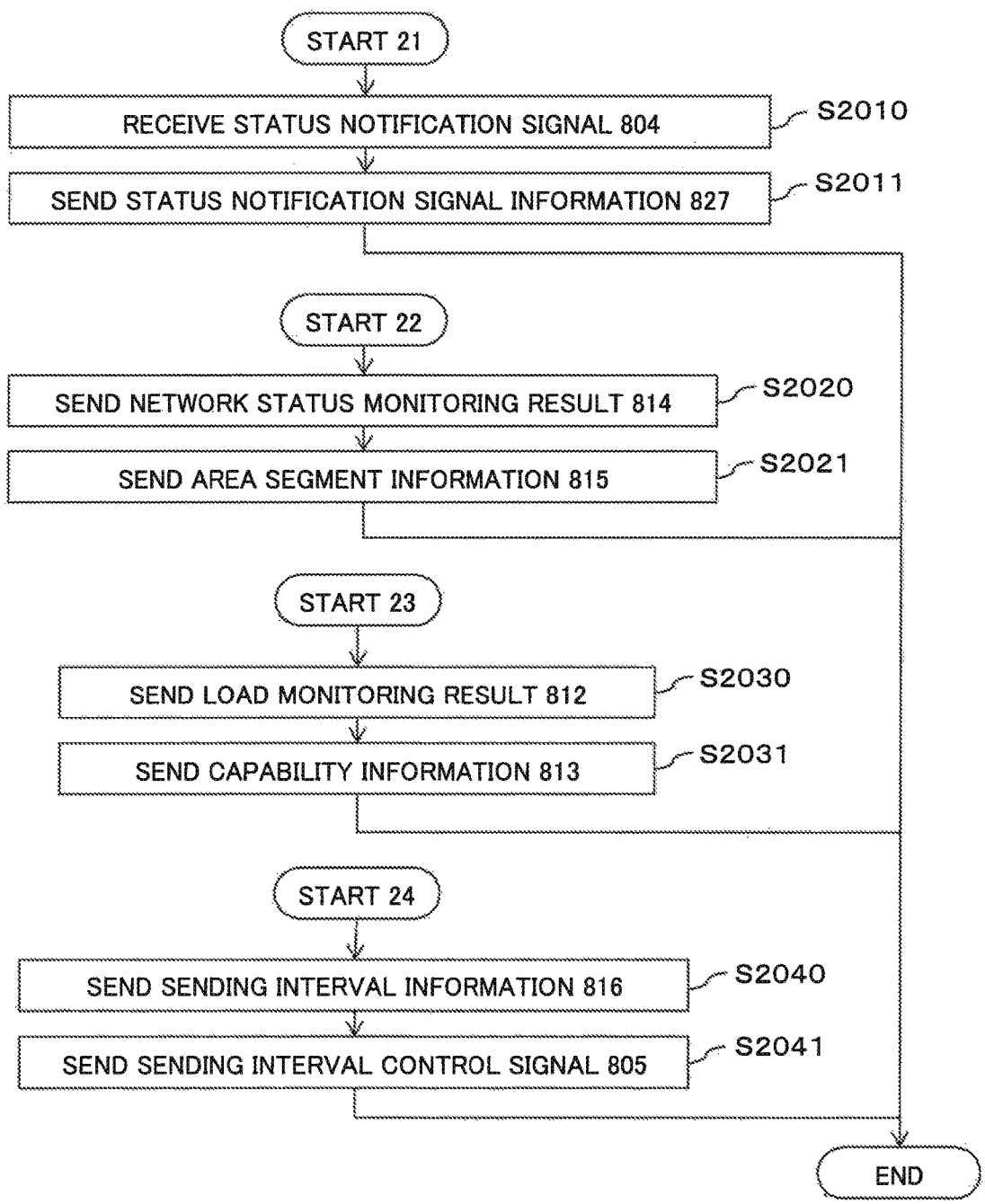
FIG. 10 is a flowchart illustrating operation of the controller according to the second example embodiment of the present invention.

FIG. 10 is a flowchart illustrating operation of the controller 110 according to the second example embodiment of the present invention. Note that processing according to the flowchart may be executed based on a program control performed by the aforementioned CPU 701. In addition, a step name of processing will be described with a sign such as S1000.

The controller 110 starts the operation of the flowchart illustrated in FIG. 10 triggering that a predetermined time has come. The predetermined time is, for example, a time of a fixed interval. Predetermined times that respectively correspond to "Start 21", "Start 22", "Start 23", and "Start 24" illustrated in FIG. 10 may be the same or different. In addition, a timing of "End" illustrated in FIG. 7 may be a start time of any arbitrary one of "Start 21", "Start 22", "Start 23" and "Start 24". For example, a timing of "End" of operation from "Start 21" may be a start time of "Start 22", a timing of "End" of operation from "Start 22" may be a start time of "Start 23", and a timing of "End" of operation from "Start 23" may be a start time of "Start 24".

When the controller 110 starts processing from "Start 21", the status notification signal receiving unit 111 receives a status notification signal 804 from each of the nodes 20 (Step S2010).

Next, the link status obtaining unit 112 obtains, based on information of the status notification signal 804, a status of each link in the network 40, and sends status notification signal information 827 based on a result of obtaining the status (Step S2011). Thereafter, the controller 110 ends the processing. Specifically, for example, when an OAM signal is used as a status monitoring signal 803 of each link, each of the nodes 20 sends, to the controller 110, the status notification signal 804 including information such as a packet loss and a delay between links at Step S2010. The link status obtaining unit 112 of the controller 110 obtains, based on a content of the status notification signal 804, a status of each link.

In addition, when the controller 110 starts processing from "Start 22", the network status monitoring unit 113 monitors a status of the network 40, and sends a network status monitoring result 814 (Step S2020). A means for monitoring a network status may be the same as, for example, the operation of the network status monitoring unit 104 according to the first example embodiment of the present invention.

Next, the monitoring area identifying unit 114 distinctively identifies a monitoring area based on the network status monitoring result 814 and the status of each link. The monitoring area identifying unit 114 generates area segment information 815 based on a result of distinctively identifying the monitoring area, and sends the generated area segment information 815 (Step S2021). Thereafter, the controller 110 ends the processing.

The second example embodiment of the present invention is different from the first example embodiment of the present invention in that a monitoring area is distinguished further based on a status of each link, in addition to a status of the network 40. Accordingly, for example, the monitoring area identifying unit 114 further sets an area segment individually to a part with respect to links with many packet losses, and notifies the sending interval calculating unit 117 of the area segment. The sending interval calculating unit 117 calculates a further shortened sending interval for the area segment.

In addition, when the controller 110 starts processing from "Start 23", the controller load monitoring unit 115 monitors a load of the controller 110, and generates and sends a load monitoring result 812 based on a result of monitoring the load (Step S2030). A means for monitoring a load of the controller 110 may be the same as, for example, the operation of the controller load monitoring unit 102 according to the first example embodiment of the present invention.

Next, the status notification signal processing capability obtaining unit 116 obtains, from the monitored state of the controller load, a processing capability of the controller 110 regarding the status notification signal 804, and sends capability information 813 based on a result of obtaining the processing capability (Step S2031). A means for obtaining a processing capability may be the same as, for example, the operation of the status notification signal processing capability obtaining unit 103 according to the first example embodiment of the present invention.

When the controller 110 starts processing from "Start 24", the sending interval calculating unit 117 calculates, based on the area segment information 815 received from the monitoring area identifying unit 114 and the capability information 813 received from the status notification signal processing capability obtaining unit 116, a sending interval for each area segment. The sending interval calculating unit 117 sends the calculated sending interval as sending interval information 816 (Step S2040). A method of calculating a sending interval may be the same as that of the first example embodiment of the present invention.

Next, the sending interval control signal transmitting unit 118 sends, based on the sending interval received from the sending interval calculating unit 117, a sending interval control signal 805 including the sending interval, to the nodes 20 in each area segment (Step S2041). Thereafter, the controller 110 ends the processing.

Next, an advantageous effect of the second example embodiment of the present invention will be described.

An effect of the second example embodiment of the present invention described above is that a sending interval for each area segment can be set more flexibly.

The reason is that the following configurations are included. First, the link status obtaining unit 112 obtains a link status from a state of a status notification signal 804. Secondly, the monitoring area identifying unit 114 distinguishes a monitoring area based on a network status monitoring result 814 and a status of each link.

Third Example Embodiment

Next, a third example embodiment of the present invention will be described in detail with reference to the drawings. Hereinafter, description of a content that overlaps with the above description will be omitted, as far as description of the third example embodiment of the present invention does not become obscure.

Figure 11:
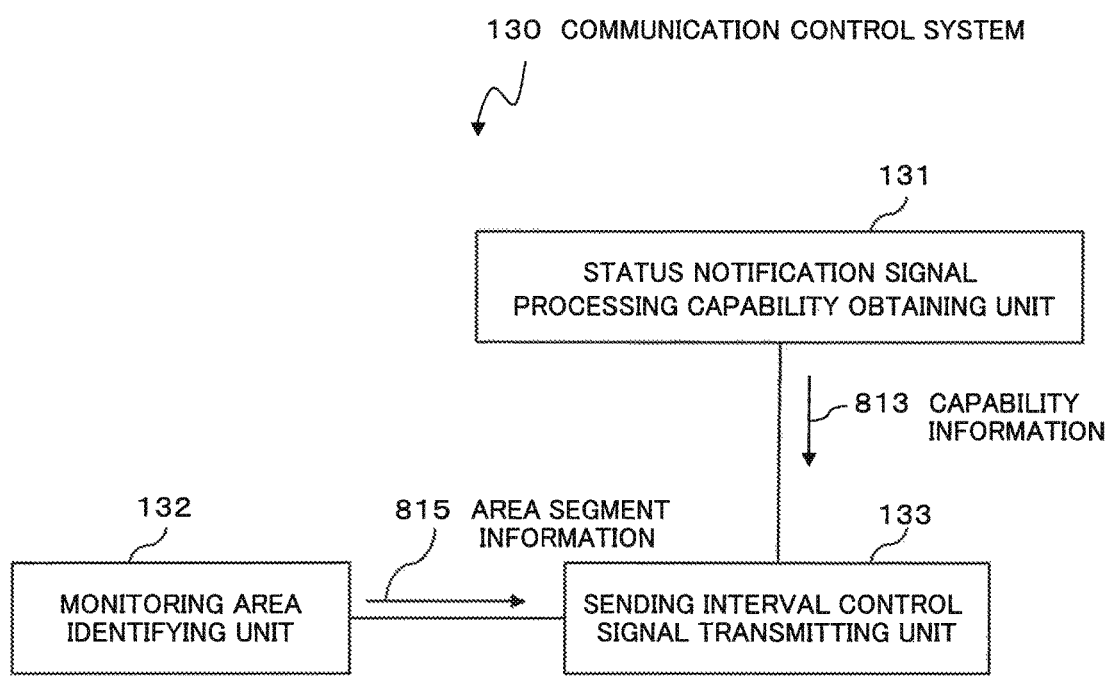
FIG. 11 is a block diagram illustrating a configuration of a controller according to a third example embodiment of the present invention.

FIG. 11 is a block diagram illustrating a configuration of a communication control system 130 according to the third example embodiment of the present invention.

As illustrated in FIG. 11, the communication control system 130 according to the third example embodiment of the present invention includes a status notification signal processing capability obtaining unit 131, a monitoring area identifying unit 132, and a sending interval control signal transmitting unit 133.

===Status Notification Signal Processing Capability Obtaining Unit 131===

The status notification signal processing capability obtaining unit 131 obtains, based on a load status of a control device, a capability for processing a status notification signal 804. The control device may control nodes included in a network, and may receive a content of a control signal sent and received between the nodes as the status notification signal 804.

The status notification signal processing capability obtaining unit 131 includes, for example, the controller load monitoring unit 102 and the status notification signal processing capability obtaining unit 103 illustrated in FIG. 2. Alternatively, the status notification signal processing capability obtaining unit 131 may include the controller load monitoring unit 115 and the status notification signal processing capability obtaining unit 116 illustrated in FIG. 9.

===Monitoring Area Identifying Unit 132===

The monitoring area identifying unit 132 determines area segments based on network status information related to communication on a network. Each of the area segments includes an arbitrarily number of nodes.

The monitoring area identifying unit 132 includes, for example, the network status monitoring unit 104 and the monitoring area identifying unit 105 illustrated in FIG. 2. Alternatively, the monitoring area identifying unit 132 may include the status notification signal receiving unit 111, the link status obtaining unit 112, the network status monitoring unit 113, and the monitoring area identifying unit 114 illustrated in FIG. 9.

===Sending Interval Control Signal Transmitting Unit 133===

The sending interval control signal transmitting unit 133 calculates, based on a capability obtained by the status notification signal processing capability obtaining unit 131, a sending interval of the status notification signal 804 of a node for each of the area segments. The sending interval control signal transmitting unit 133 sends a sending interval (for example, a sending interval control signal 805 including sending interval information 816) to nodes included in each of the area segments.

The sending interval control signal transmitting unit 133 includes, for example, the sending interval calculating unit 106 and the sending interval control signal transmitting unit 107 illustrated in FIG. 2. Alternatively, the sending interval control signal transmitting unit 133 may include the sending interval calculating unit 117 and the sending interval control signal transmitting unit 118 illustrated in FIG. 9.

The communication control system 130 may be implemented by the computer 700 illustrated in FIG. 6, similarly to the controller 100.

In this case, the CPU 701 executes, in accordance with a read program and based on read data, various types of processing as the status notification signal processing capability obtaining unit 131, the monitoring area identifying unit 132, and the sending interval control signal transmitting unit 133 illustrated in FIG. 11. Herein, the program is, for example, a program for causing the computer 700 to execute the operation of the flowchart illustrated in FIG. 7 or 10 described above.

By including the above configurations, the third example embodiment of the present invention has the same advantageous effect as that of the first example embodiment or the second example embodiment of the present invention.

Modified Example of Third Example Embodiment

Figure 12:
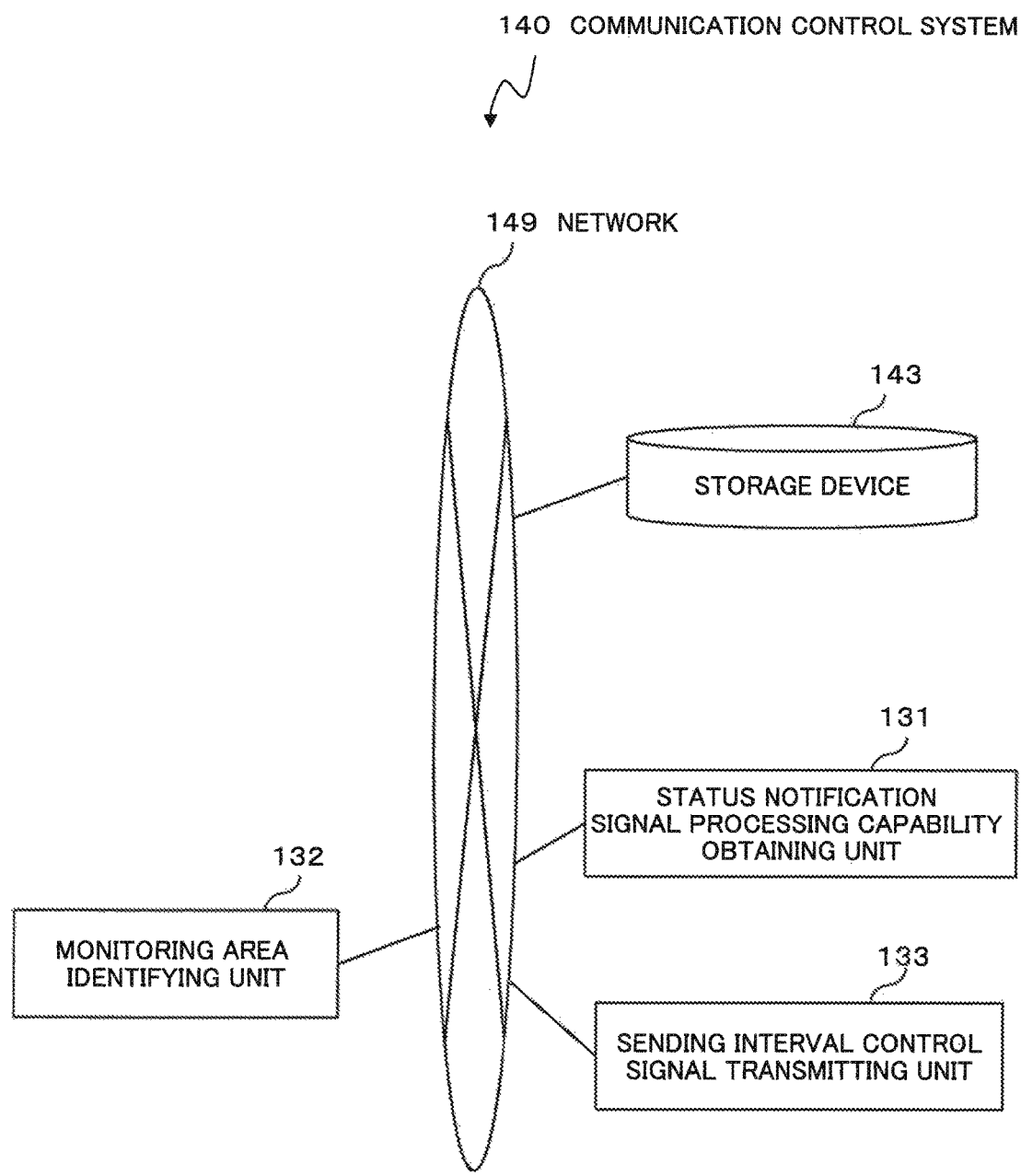
FIG. 12 is a diagram illustrating an example of a communication control system that is a modified example of the third example embodiment of the present invention.

FIG. 12 is a diagram illustrating an example of a communication control system 140 that is a modified example of the third example embodiment of the present invention. As illustrated in FIG. 12, the communication control system 140 includes a storage device 143, and the status notification signal processing capability obtaining unit 131, the monitoring area identifying unit 132, and the sending interval control signal transmitting unit 133 illustrated in FIG. 11. The storage device 143, the status notification signal processing capability obtaining unit 131, the monitoring area identifying unit 132, and the sending interval control signal transmitting unit 133 are connected with one another via a network 149. Note that an arbitrary combination of the storage device 143, the status notification signal processing capability obtaining unit 131, the monitoring area identifying unit 132, and the sending interval control signal transmitting unit 133 may be the single computer 700 as illustrated in FIG. 6. In addition, arbitrary ones of the storage device 143, the status notification signal processing capability obtaining unit 131, the monitoring area identifying unit 132, and the sending interval control signal transmitting unit 133 may be connected with each other directly without using a network. In other words, the storage device 143, the status notification signal processing capability obtaining unit 131, the monitoring area identifying unit 132, and the sending interval control signal transmitting unit 133 may be connected with one another arbitrarily via the network 149.

The network 149 may be a part of the network 40 illustrated in FIG. 1.

===Status Notification Signal Processing Capability Obtaining Unit 131===

The status notification signal processing capability obtaining unit 131 sends capability information 813 to the sending interval control signal transmitting unit 133 via the network 149.

===Monitoring Area Identifying Unit 132===

The monitoring area identifying unit 132 sends area segment information 815 to the sending interval control signal transmitting unit 133 via the network 149.

===Sending Interval Control Signal Transmitting Unit 133===

The sending interval control signal transmitting unit 133 receives, via the network 149, the capability information 813 sent from the status notification signal processing capability obtaining unit 131 and the area segment information 815 sent from the monitoring area identifying unit 132.

===Storage Device 143===

The storage device 143 may arbitrarily store the load monitoring result 812, the capability information 813, the network status monitoring result 814, the area segment information 815, the sending interval information 816, the status notification signal 804, the sending interval control signal 805, the status notification signal information 827, and the link status information 828 described above.

An advantageous effect of the modified example of the third example embodiment of the present invention described above is that construction of the communication control system 140 can be realized flexibly.

The reason is that the storage device 143, the status notification signal processing capability obtaining unit 131, the monitoring area identifying unit 132, and the sending interval control signal transmitting unit 133 are connected with one another arbitrarily via the network 149.

The components described in each of the above example embodiments may not necessarily be individually independent existences. For example, a plurality of arbitrary components may be implemented as one module. In addition, arbitrary one of the components may be implemented by a plurality of modules. In addition, arbitrary one of the components may be arbitrary another one of the components. In addition, a part of arbitrary one of the components may overlap with a part of arbitrary another one of the components.

The components according to each of the example embodiments described above and modules implementing the components may be implemented in a hardware manner as needed, when possible. Alternatively, the components and modules implementing the components may be implemented by a computer and a program. Alternatively, the components and modules implementing the components may be implemented by a mixture of a hardware-like module, a computer, and a program.

A program is recorded on a computer-readable non-transitory recording medium such as a magnetic disk and a semiconductor memory, for example, and is provided to a computer. Then, the program is read by the computer from the non-transitory recording medium at a time of start-up of the computer and the like. The read program causes the computer to function as the components according to each of the example embodiments described above by controlling operation of the computer.

In addition, in each of the example embodiments described above, a plurality of operations are described in order in the form of flowchart. However, the order of description does not limit order of executing the plurality of operations. Therefore, when carrying out each of the example embodiments, the order of the plurality of operations can be changed, as far as the change does not detract from a content.

Further, in each of the example embodiments described above, a plurality of operations are not limited to be executed at individually different timings. For example, during execution of a certain operation, another operation may occur. In addition, an execution timing of a certain operation may partially or entirely overlap with that of another operation.

Further, in each of the example embodiments described above, a certain operation is described to be a trigger of another operation. However, the description does not limit a relation between the certain operation and another operation. Therefore, when carrying out each of the example embodiments, a relation between operations can be changed, as far as the change does not detract from a content. In addition, specific description of the operations of the components does not limit the operations of the components. Therefore, the specific operations of the components may be changed, as far as the change does not detract from characteristics in terms of function, performance, and others for carrying out each of the example embodiments.

While the present invention has been particularly shown and described with reference to the example embodiments thereof, the present invention is not limited to the embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2015-007665, filed on Jan. 19, 2015, the disclosure of which is incorporated herein in its entirety by reference.

REFERENCE SIGNS LIST

10 Controller
20 Node
40 Network
100 Controller
101 Status notification signal receiving unit
102 Controller load monitoring unit
103 Status notification signal processing capability obtaining unit
104 Network status monitoring unit
105 Monitoring area identifying unit
106 Sending interval calculating unit
107 Sending interval control signal transmitting unit
110 Controller
111 Status notification signal receiving unit 112 Link status obtaining unit
113 Network status monitoring unit
114 Monitoring area identifying unit
115 Controller load monitoring unit
116 Status notification signal processing capability obtaining unit
117 Sending interval calculating unit
118 Sending interval control signal transmitting unit
130 Communication control system
131 Status notification signal processing capability obtaining unit
132 Monitoring area identifying unit
133 Sending interval control signal transmitting unit
140 Communication control system
143 Storage device
149 Network
200 Node
201 Status monitoring signal receiving unit
202 Status notification signal transmitting unit
203 Sending interval control signal receiving unit
204 Status monitoring signal transmitting unit
210 Node
211 Status monitoring signal receiving unit
212 Status notification signal transmitting unit
213 Sending interval control signal receiving unit
214 Status monitoring signal transmitting unit
700 Computer
701 CPU
702 Storage unit
703 Storage device
704 Input unit
705 Output unit
706 Communication unit
707 Recording medium
803 Status monitoring signal
804 Status notification signal
805 Sending interval control signal
812 Load monitoring result
813 Capability information
814 Network status monitoring result
815 Area segment information
816 Sending interval information
827 Status notification signal information
828 Link status information

The invention claimed is:

1. A communication control system comprising:
a memory storing instructions; and
one or more processors configured to execute the instructions to:
obtain, based on a load status of a control device that controls nodes included in a network and receives a content of a control signal sent and received between the nodes as a status notification signal, a capability for processing the status notification signal;
determine, based on network status information related to communication on the network, area segments each including an arbitrarily number of the nodes; and
calculate, based on the capability, a sending interval of the status notification signals of the nodes for each of the area segments, and send the sending interval to the nodes included in the corresponding area segment, wherein
the sending interval is calculated based on a relation and a condition, the relation being that a total value multiplied by a predetermined coefficient is equal to the capability, the total value being a total of values that each of the values is obtained by dividing a number of the nodes included in each of the area segments by the sending interval for the corresponding area segment, the condition being a condition of a length relation of the sending interval between the area segments.

2. The communication control system according to claim 1, wherein the network status information includes an inflow/outflow state traffic in the network or a priority of traffic in the network.

3. The communication control system according to claim 1, wherein the area segments are determined further based on link status information related to a status of a link in the network obtained from the status notification signal.

4. The communication control system according to claim 3, wherein the link status information includes at least a number of packet losses in the link.

5. The communication control system according to claim 1, further comprising
the nodes that receive the sending interval and send status notification signals based on the received sending interval.

6. A communication control method performed by a computer comprising:
obtaining, based on a load status of a control device that controls nodes included in a network and receives a content of a control signal sent and received between the nodes as a status notification signal, a capability for processing the status notification signal;
determining, based on network status information related to communication on the network, area segments each including an arbitrarily number of the nodes;
calculating, based on the capability, a sending interval of the status notification signals of the nodes for each of the area segments; and
sending the sending interval to the nodes included in the corresponding area segment, wherein
the sending interval is calculated based on a relation and a condition, the relation being that a total value multiplied by a predetermined coefficient is equal to the capability, the total value being a total of values that each of the values is obtained by dividing a number of the nodes included in each of the area segments by the sending interval for the corresponding area segment, the condition being a condition of a length relation of the sending interval between the area segments.

7. The communication control method according to claim 6, wherein the area segments are determined further based on link status information related to a status of a link in the network obtained from the status notification signal.

8. A non-transitory computer readable storage medium recording thereon a program causing a computer to perform a method comprising:
obtaining, based on a load status of a control device that controls nodes included in a network and receives a content of a control signal sent and received between the nodes as a status notification signal a capability for processing the status notification signal;
determining, based on network status information related to communication on the network, area segments each including an arbitrarily number of the nodes;
calculating, based on the capability, a sending interval of the status notification signals of the nodes for each of the area segments; and
sending the sending interval to the nodes included in the corresponding area segment, wherein
the sending interval is calculated based on a relation and a condition, the relation being that a total value multiplied by a predetermined coefficient is equal to the capability, the total value being a total of values that each of the values is obtained by dividing a number of the nodes included in each of the area segments by the sending interval for the corresponding area segment, the condition being a condition of a length relation of the sending interval between the area segments.

9. The non-transitory computer readable storage medium recording thereon the program according to claim 8 causing a computer to perform the method, wherein the area segments are determined further based on link status information related to a status of a link in the network obtained from the status notification signal.

\* \* \* \* \*

UNITED STATES PATENT AND TRADEMARK OFFICE
CERTIFICATE OF CORRECTION

PATENT NO.         : 10,462,016 B2
APPLICATION NO.    : 15/541187
DATED              : October 29, 2019
INVENTOR(S)        : Masahiro Hayashitani and Yasuhiro Mizukoshi Page 1 of 1

It is certified that error appears in the above-identified patent and that said Letters Patent is hereby corrected as shown below:

In the Claims

Column 20, Line 18; In Claim 5, after "interval", insert --,--

Column 20, Line 55; In Claim 8, after "signal", insert --,--

Signed and Sealed this
Twenty-fourth Day of November, 2020

Andrei Iancu
*Director of the United States Patent and Trademark Office*